May 7, 1929.　　　O. SAMMINIATELLI　　　1,712,282
DISPLAY DEVICE
Filed Dec. 2, 1927　　2 Sheets-Sheet 1
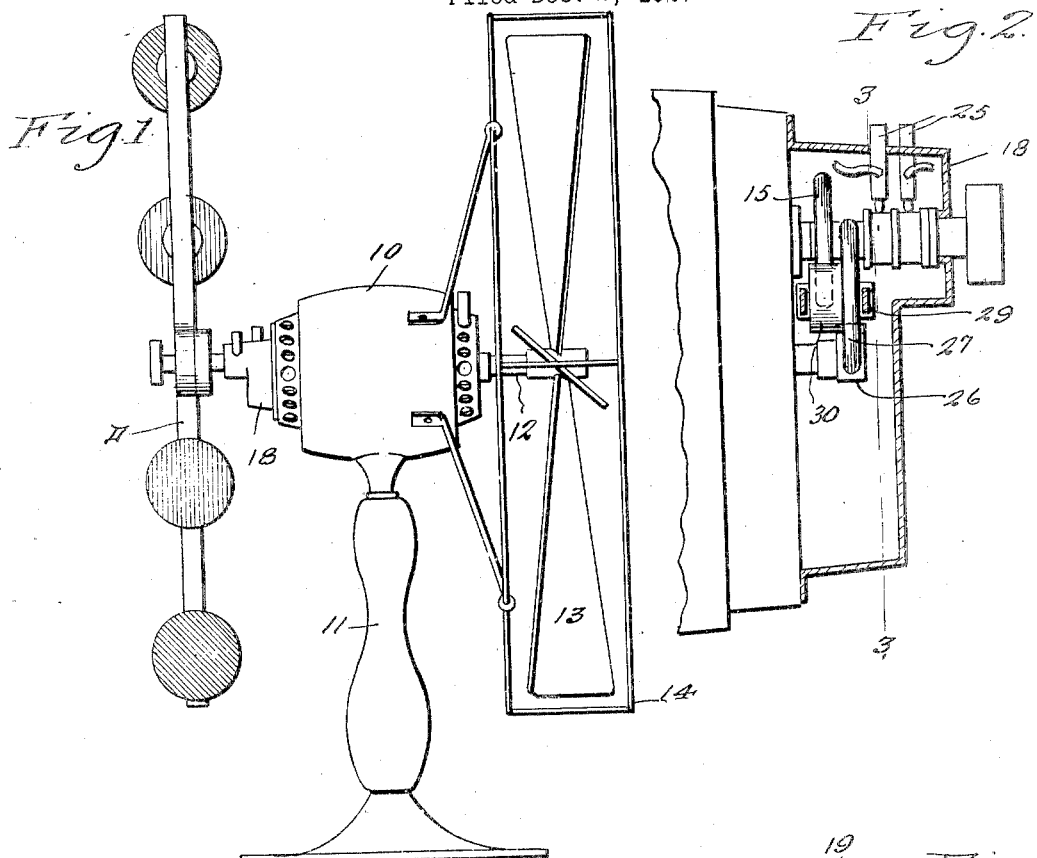
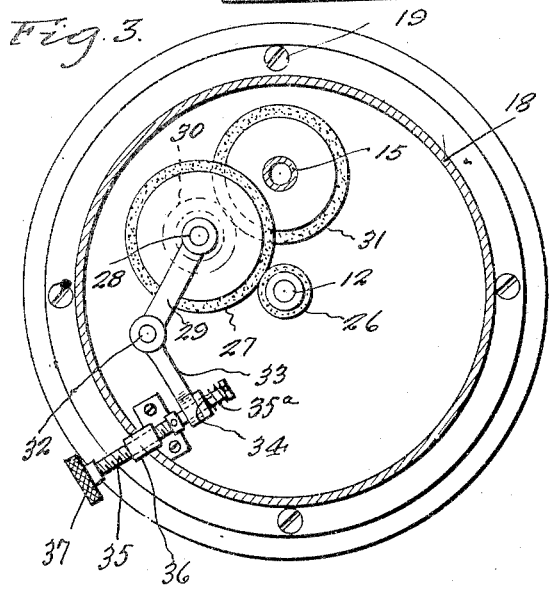
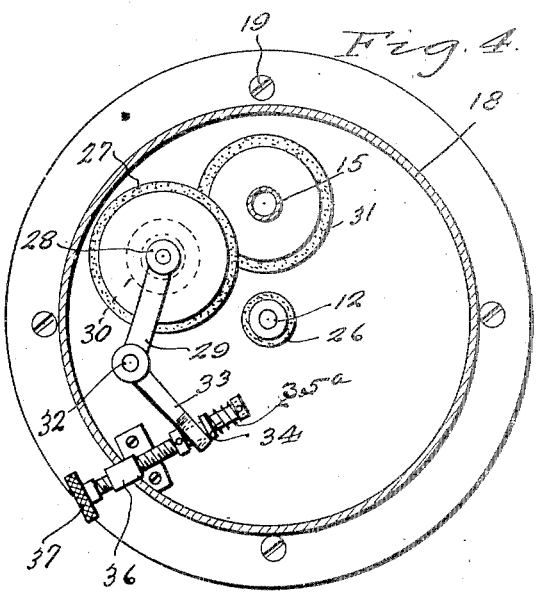
Oreste Samminiatelli INVENTOR
BY Victor J. Evans
ATTORNEY
WITNESS:

May 7, 1929.  O. SAMMINIATELLI  1,712,282
DISPLAY DEVICE
Filed Dec. 2, 1927    2 Sheets-Sheet 2

Oreste Samminiatelli INVENTOR
BY Victor J. Evans
ATTORNEY

Patented May 7, 1929.

1,712,282

UNITED STATES PATENT OFFICE.

ORESTE SAMMINIATELLI, OF EAST TOLEDO, OHIO.

DISPLAY DEVICE.

Application filed December 2, 1927. Serial No. 237,279.

This invention relates to improvements in display devices, the present invention being an improvement upon the display device disclosed in applications Serial No. 152,950 and #157,372, filed by me December 6, 1926, and December 27, 1926, respectively, and is a companion case with an application filed by me of even date herewith.

An object of the present invention is the provision of a display device which may be attached to an ordinary electric fan so as to provide a window and other display, and the fan and the device used simultaneously, or the fan used without the device.

Another object of the invention is the provision of means for providing a driving connection between the fan motor and the device, whereby the speed of operation of the device may be controlled, or the fan may be used with the display device idle and without removal from the fan.

With the above and other objects in view, the invention further includes the following novel features and details of construction, to be hereinafter more fully described, illustrated in the accompanying drawings and pointed out in the appended claims.

In the drawings:—

Figure 1 is an elevation showing the invention applied to an electric fan.

Figure 2 is an enlarged fragmentary sectional view illustrating the driving connection between the device and the fan motor.

Figure 3 is a section taken substantially on the line 3—3 of Figure 2 with the gearing arranged to operate the display device.

Figure 4 is a similar view showing the position of the gearing when the display device is inactive.

Figure 5:
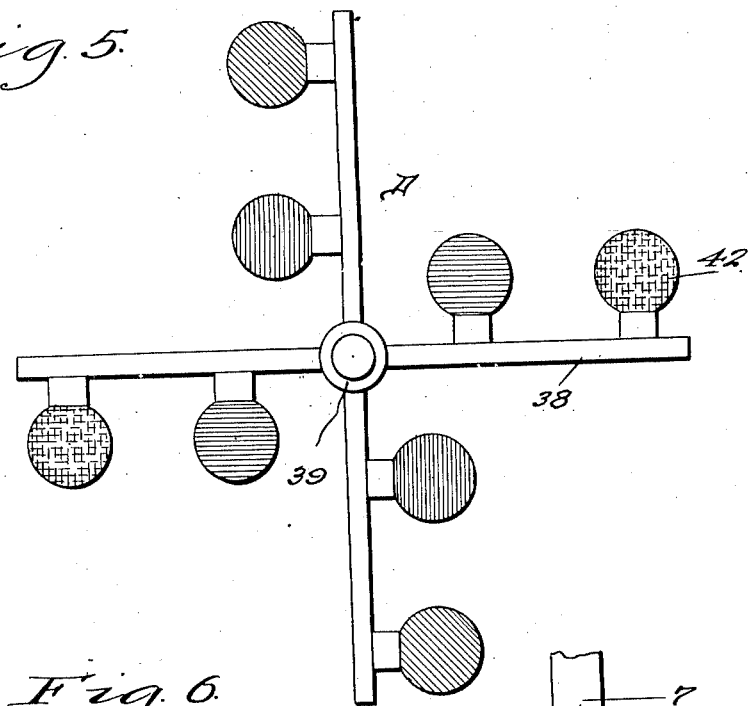
Figure 5 is an elevation of the display device per se.
Figure 6:
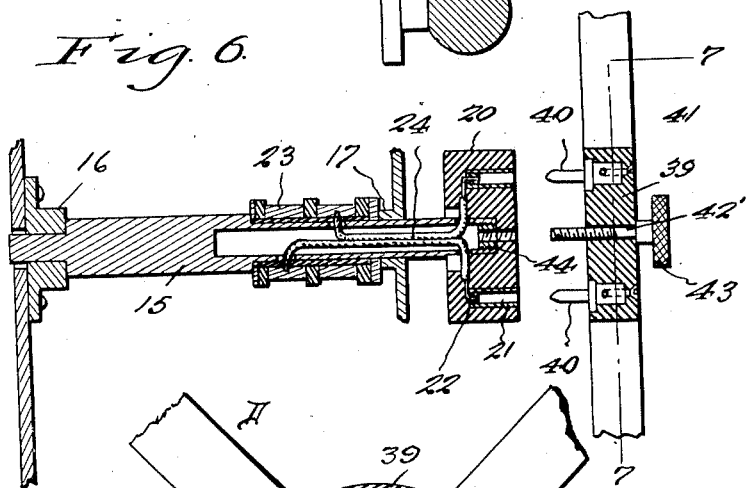
Figure 6 is a sectional view taken axially of the countershaft and showing the manner of removably attaching the display device to the shaft.
Figure 7:
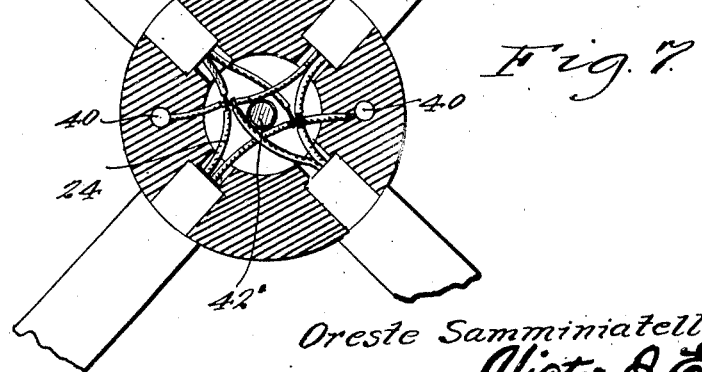
Figure 7 is a section taken substantially on the line 7—7 of Figure 6.

Referring to the drawings in detail wherein like characters of reference denote corresponding parts, the reference character 10 indicates the housing of the fan motor which is mounted upon a pedestal 11, while the motor shaft is shown at 12, the blades 13 of the fan being shown as operating within a guard 14.

The invention resides in the means for mounting and driving the display device and comprises a countershaft 15 whose inner end is mounted in a bearing 16 carried by the housing 10 and whose outer end is mounted in a bearing 17 which is carried by a casing 18, the latter being secured to the housing 10 by means of screws 19. This casing is positioned over one end of the housing 10 and the shaft 15 extends through this casing and has mounted thereon an insulating block 20. The block 20 is provided with spaced sockets 21 and located at the inner ends of these sockets are electric contacts 22. The contacts are in electrical connection with collector rings 23 which are mounted upon the shaft 15 and for this purpose, conductors 24 extend through the shaft 15, the latter being hollow at its outer end. The collector rings 23 are engaged by brushes 25 which are connected in circuit with the fan motor.

Mounted upon the motor shaft 12 is a friction pinion 26 which engages and drives a friction gear 27, the latter being mounted upon a stub shaft 28 which is carried at one end of an arm 29. Also mounted upon the shaft 28 and rotatable with the friction gear 27 is a friction pinion 30 which engages and drives a friction gear 31 which is fast upon the shaft 15, so that when the parts are in the position shown in Figure 3, the countershaft 15 will be rotated. The arm 29 forms one arm of a bell crank lever which is pivotally mounted as shown at 32, while the other arm 33 of this lever has pivotally and slidingly connected thereto as shown at 34, the inner end of a threaded shaft 35. This shaft extends through the casing 18 and operates in a nut 36 and is provided upon its outer end with a finger piece or head 37 by means of which it may be conveniently rotated. By rotating the shaft 35, the bell crank lever may be rocked upon its shaft 32 so as to move the gear 27 into and out of engagement with the pinion 26. This is clearly shown in Figures 3 and 4 of the drawings, the last mentioned figure illustrating the position of the gears when the countershaft 15 is idle. By this means, the shaft 15 may be operated simultaneously with the operation of the fan, or the latter may be operated independently of the shaft 15. In addition, by regulating the pressure of contact between the pinion 26 and the gear 27, the speed of rotation of the shaft 15 may be controlled. A spring 35ª is mounted upon the shaft 35 and bears against the arm 33 to yieldingly hold the gear 27 engaged with the pinion 26.

The shaft 15 is designed to operate a display device such as indicated at D in Figure 5 of the drawings, or any one of the display devices illustrated in my co-pending applications. The display device illustrated in the present application comprises radial arms 38 which extend from a hub 39. This hub is formed of insulating material and has projecting from one face studs 40. These studs are electrically connected by means of conductors 41 with lamps 42 which are carried by the radial arms 38, so that the lamps will be connected in circuit with the fan motor.

Extending through the hub 39 is a screw 42' which is provided with a knurled head 43 and which is adapted to extend through an opening provided in the block 20 so as to engage a nut 55. The display device is thus securely attached to the block 30 so as to resist centrifugal action, and at the same time the studs 40 which are formed by conducting material, are held in proper contact with the contacts 22.

The invention is susceptible of various changes in its form, proportions and minor details of construction and the right is herein reserved to make such changes as properly fall within the scope of the appended claims.

Having described the invention what is claimed is:—

1. The combination with an electric fan, of a display device supported for rotation by the housing of the fan motor, means operatively connecting the display device with the shaft of said motor to operate said device, and means to control the speed of operation of the display devices independently of the operation of the fan.

2. The combination with an electric fan, of a display device supported for rotation by the housing of the fan motor, means operatively connecting the display device with the shaft of said motor to operate said device, and means to adjust said connecting means to control the speed of operation of the display device independently of the operation of the fan.

3. The combination with an electric fan, of a countershaft located adjacent the shaft of the fan motor, a display device mounted upon the countershaft, gearing connecting the countershaft with the shaft of the motor, and means to regulate the speed of operation of the display device independently of the operation of the fan.

4. The combination with an electric fan, of a casing, means to secure the casing to the housing of the fan motor, a countershaft located within and extending through the casing, a display device mounted upon the countershaft, means operatively connecting the countershaft with the shaft of the motor, and means to adjust the connecting means to control the speed of operation of the display device independently of the operation of the fan.

In testimony whereof I affix my signature.

ORESTE SAMMINIATELLI.